US009959613B2

(12) United States Patent
Ohno et al.

(10) Patent No.: US 9,959,613 B2
(45) Date of Patent: May 1, 2018

(54) OPTICAL PROCESSING HEAD, OPTICAL PROCESSING APPARATUS, AND CONTROL METHOD AND CONTROL PROGRAM OF OPTICAL PROCESSING APPARATUS (71) Applicant: TECHNOLOGY RESEARCH ASSOCIATION FOR FUTURE ADDITIVE MANUFACTURING, Tokyo (JP)

(72) Inventors: Hiroshi Ohno, Yokohama (JP); Takashi Obara, Yokohama (JP); Yuji Sasaki, Yokohama (JP); Mitsuo Sasaki, Yokohama (JP); Kazuyuki Masukawa, Yokohama (JP)

(73) Assignee: TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 0 days. days.

(21) Appl. No.: 14/889,361

(22) PCT Filed: Mar. 20, 2015

(86) PCT No.: PCT/JP2015/058624
§ 371 (c)(1),
(2) Date: Nov. 5, 2015

(87) PCT Pub. No.: WO2016/151712
PCT Pub. Date: Sep. 29, 2016

(65) Prior Publication Data
US 2017/0186143 A1 Jun. 29, 2017

(51) Int. Cl.
G01N 21/55 (2014.01)
G06T 7/00 (2017.01)
(Continued)

(52) U.S. Cl.
CPC .............. *G06T 7/001* (2013.01); *B22F 3/008* (2013.01); *B23K 26/032* (2013.01);
(Continued)

(58) Field of Classification Search
CPC . G06T 7/001; G06T 7/60; G06T 2207/30164; B33Y 30/00; B33Y 50/02;
(Continued)

(56) References Cited

U.S. PATENT DOCUMENTS 6,605,795 B1    8/2003  Arcella et al.
8,097,825 B2 *  1/2012  Sato ..................... B23K 26/103
                                                         219/63

(Continued)

FOREIGN PATENT DOCUMENTS

CA    2 251 082 C    4/1999
CA    2 824 042 A1   2/2014
(Continued)

OTHER PUBLICATIONS

International Search Report (ISR) dated Jun. 24, 2015 for International Application No. PCT/JP2015/058624.
(Continued)

*Primary Examiner* — Tri T Ton
(74) *Attorney, Agent, or Firm* — Ladas & Parry LLP (57) ABSTRACT This specification discloses an optical processing head including a light guide portion that guides, to a process surface, a ray for processing. The light guide portion is further configured to guide, to the process surface, a ray for inspection different in wavelength from the ray for processing. The optical processing head further includes an inspection portion that inspects the state of the process surface based on reflected light of the ray for inspection reflected by
(Continued)

the process surface. With the optical processing head, the state of the process surface can be easily inspected even during optical processing.

21 Claims, 9 Drawing Sheets

(51) Int. Cl.

| | | |
|---|---|---|
| *B29C 67/00* | (2017.01) | |
| *B23K 26/03* | (2006.01) | |
| *B23K 26/06* | (2014.01) | |
| *B23K 26/08* | (2014.01) | |
| *B23K 26/14* | (2014.01) | |
| *B23K 26/342* | (2014.01) | |
| *B23K 26/144* | (2014.01) | |
| *B23K 26/70* | (2014.01) | |
| *B33Y 30/00* | (2015.01) | |
| *B33Y 50/02* | (2015.01) | |
| *B22F 3/00* | (2006.01) | |
| *G01B 11/27* | (2006.01) | |
| *G02B 27/14* | (2006.01) | |
| *G06T 7/60* | (2017.01) | |
| *B29C 64/20* | (2017.01) | |
| *B29C 64/386* | (2017.01) | |

(52) U.S. Cl.
CPC ...... *B23K 26/0643* (2013.01); *B23K 26/0665* (2013.01); *B23K 26/0861* (2013.01); *B23K 26/144* (2015.10); *B23K 26/1464* (2013.01); *B23K 26/342* (2015.10); *B23K 26/703* (2015.10); *B29C 64/20* (2017.08); *B29C 64/386* (2017.08); *B29C 67/00* (2013.01); *B33Y 30/00* (2014.12); *B33Y 50/02* (2014.12); *G01B 11/272* (2013.01); *G02B 27/144* (2013.01); *G06T 7/60* (2013.01); *G06T 2207/30164* (2013.01)

(58) Field of Classification Search
CPC .. B23K 26/703; B23K 26/342; B23K 26/032; B22F 3/008; B29C 67/0085; B29C 67/0088; G01B 11/272; G02B 27/144
USPC ................................................ 356/432–236
See application file for complete search history.

(56) References Cited

U.S. PATENT DOCUMENTS

| | | | | |
|---|---|---|---|---|
| 8,890,023 | B2 * | 11/2014 | Dorsch | ............... B23K 26/032 219/121.64 |
| 2014/0053956 | A1 | 2/2014 | Etter et al. | |
| 2015/0064047 | A1 | 3/2015 | Hyde et al. | |

FOREIGN PATENT DOCUMENTS

| | | |
|---|---|---|
| DE | 10 2007 032 190 A1 | 1/2009 |
| DE | 20 2013 004 725 U1 | 6/2013 |
| JP | 3-52785 A | 3/1991 |
| JP | 11-245059 A | 9/1999 |
| JP | 2002-160084 A | 2/2002 |
| JP | 2003-340583 A | 12/2003 |
| JP | 2009-160658 A | 7/2009 |
| WO | 2013/110467 A1 | 8/2013 |

OTHER PUBLICATIONS

J-PlatPat English abstract of JP 11-245059 A.
J-PlatPat English abstract of JP 2009-160658 A.
J-PlatPat English abstract of JP 3-52785 A.
J-PlatPat English abstract of JP 2002-160084 A.
J-PlatPat English abstract of JP 2003-340583 A.
Extended European Search Report (ESR) dated Feb. 27, 2017 in connection with corresponding European Application No. 15785037.1.
Espacenet English abstract of DE 10 2007 032 190 A1.
English translation of DE 20 2013 004 725 U1.

* cited by examiner

OPTICAL PROCESSING HEAD, OPTICAL PROCESSING APPARATUS, AND CONTROL METHOD AND CONTROL PROGRAM OF OPTICAL PROCESSING APPARATUS

RELATED APPLICATION

This application is an application under 35 U.S.C. 371 of International Application No. PCT/JP2015/058624 filed on Mar. 20, 2015, the entire contents of which are incorporated herein by reference.

TECHNICAL FIELD

The present invention relates to an optical processing head, an optical processing apparatus, and a control method and control program of the optical processing apparatus.

BACKGROUND ART

In the above technical field, patent literature 1 discloses a technique of detecting the tilt of a process surface by using a measurement device provided outside an optical processing head.

CITATION LIST

Patent Literature

Patent literature 1: Canadian Patent Application Publication No. CA2251082A1

SUMMARY OF THE INVENTION

Technical Problem

In the technique described in this literature, however, the measurement device includes an inspection optical system completely independent of an optical system that guides a ray for processing to a process surface. Thus, independent adjustment needs to be performed for the measurement device.

The present invention enables to provide a technique of solving the above-described problem.

Solution to Problem

One aspect of the present invention provides an optical processing head comprising:

a light guide portion that guides, to a process surface, a ray for processing and a ray for inspection different in wavelength from the ray for processing; and an inspection portion that inspects a state of the process surface from reflected light of the ray for inspection reflected by the process surface.

Another aspect of the present invention provides an optical processing apparatus comprising:

a light source for processing that emits the ray for processing; and a light source for inspection that emits the ray for inspection.

Still other aspect of the present invention provides a control method of an optical processing apparatus including:

an optical processing head including:

a light guide portion that guides, to a process surface, a ray for processing and a ray for inspection different in wavelength from the ray for processing; and an inspection portion including, in order to inspect a state of the process surface from reflected light of the ray for inspection reflected by the process surface, an image capturing unit that captures a spot image of the ray for inspection, and a unit that calculates a tilt angle of the process surface with respect to the reference process surface, based on a distance between a spot center included in the spot image of the ray for inspection and a reference spot center included in a reference spot image obtained by capturing an image of the ray for inspection reflected by a reference process surface perpendicular to an optical axis of the ray for processing; and a controller that controls a tilt of one of the process surface and the optical processing head in accordance with the calculated tilt angle, the method comprising:

controlling the tilt of one of the process surface and the optical processing head in accordance with the calculated tilt angle so as to locate the process surface and the optical processing head at predetermined relative positions.

Still other aspect of the present invention provides a control program of an optical processing apparatus including:

an optical processing head including:

a light guide portion that guides, to a process surface, a ray for processing and a ray for inspection different in wavelength from the ray for processing; and an inspection portion including, in order to inspect a state of the process surface from reflected light of the ray for inspection reflected by the process surface, an image capturing unit that captures a spot image of the ray for inspection, and a unit that calculates a tilt angle of the process surface with respect to the reference process surface, based on a distance between a spot center included in the spot image of the ray for inspection and a reference spot center included in a reference spot image obtained by capturing an image of the ray for inspection reflected by a reference process surface perpendicular to an optical axis of the ray for processing; and a controller that controls a tilt of one of the process surface and the optical processing head in accordance with the calculated tilt angle, the program causing a computer to execute:

controlling the tilt of one of the process surface and the optical processing head in accordance with the calculated tilt angle so as to locate the process surface and the optical processing head at predetermined relative positions.

Advantageous Effects of Invention

According to the present invention, the state of a process surface can be easily inspected in optical processing.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise. In the following embodiments, "light" includes various electromagnetic waves ranging from ultraviolet light to a microwave, and can be properly selected in accordance with a processing target or the like.

First Embodiment

Figure 1:
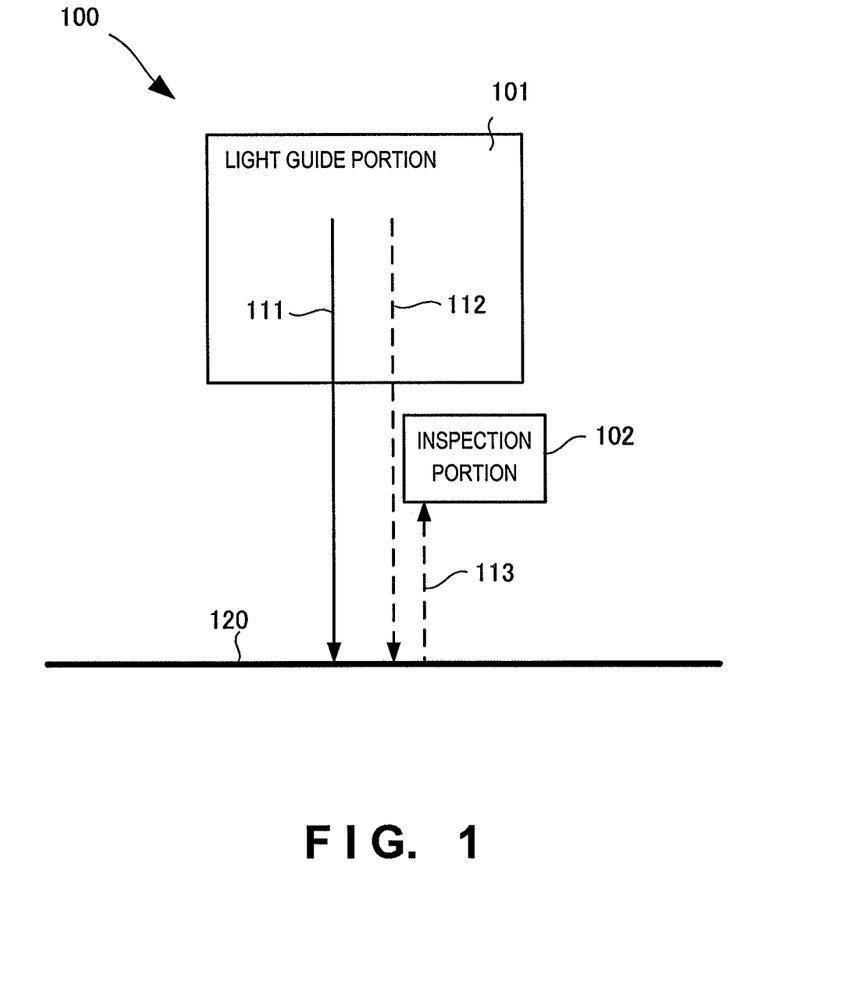
FIG. 1 is a view showing the arrangement of an optical processing head according to the first embodiment of the present invention.

An optical processing head 100 according to the first embodiment of the present invention will be described with reference to FIG. 1. The optical processing head 100 includes a light guide portion 101 and an inspection portion 102.

The light guide portion 101 guides a ray 111 for processing and a ray 112 for inspection to a process surface 120. The ray 112 for inspection and the ray 111 for processing are rays having different wavelengths.

The inspection portion 102 inspects the state of the process surface 120 from reflected light 113 of the ray 112 for inspection reflected by the process surface 120.

With the above-described arrangement, the state of a process surface such as the tilt of the process surface or the concentration of a processing material on the process surface can be easily inspected in optical processing. Since the ray 111 for processing and the ray 112 for inspection have different wavelengths, these rays do not interfere with each other in the light guide portion 101. This arrangement also has an advantage in which these rays can be superimposed on each other and the light guide portion 101 can be downsized. Further, the reflected light 113 of the ray 112 for inspection can be separated from reflected light of the ray 111 for processing. That is, the inspection portion 102 can separate and receive only the reflected light 113, and noise generated by the ray 111 for processing can be reduced.

Second Embodiment

Figure 2:
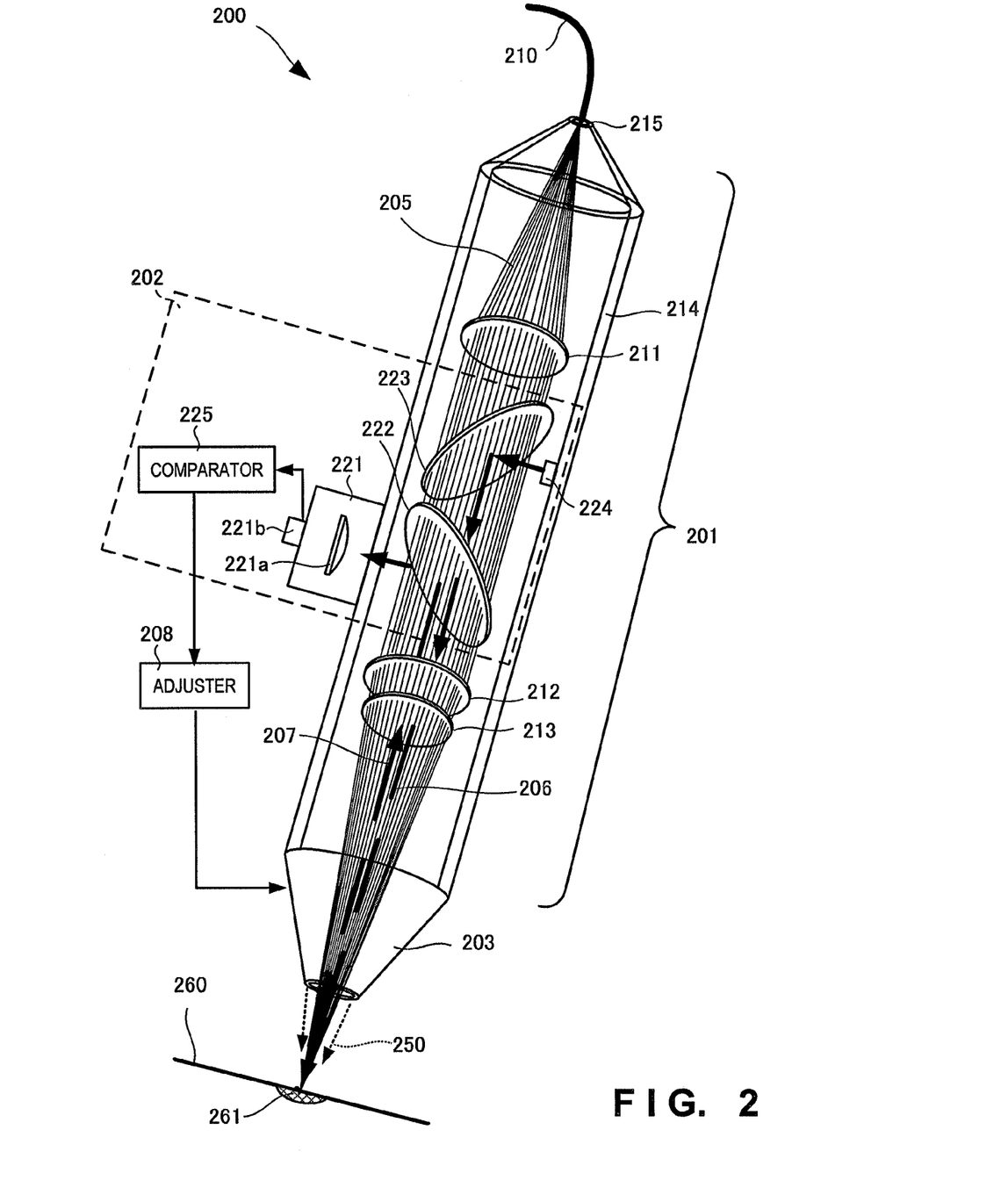
FIG. 2 is a perspective view showing the arrangement of an optical processing head according to the second embodiment of the present invention.

An optical processing head 200 according to the second embodiment of the present invention will be described with reference to FIG. 2. FIG. 2 is a view showing the internal arrangement of the optical processing head 200 to which a laser beam is applied. As shown in FIG. 2, the optical processing head 200 includes a condensing optical system device 201 functioning as a light guide portion, an inspection unit 202 functioning as an inspection portion, and a nozzle 203.

(Overall Arrangement of Head)

The condensing optical system device 201 includes a collimator lens 211, a condenser lens 212, a cover glass 213 that covers the condenser lens 212, and a housing 214 that holds these lenses. The collimator lens 211 converts, into parallel light, a ray 205 for processing that travels from an incident end 215. The condenser lens 212 condenses the parallel light toward a process surface 260 on the downstream side.

With these optical systems, the condensing optical system device 201 can guide, to the process surface 260, the ray 205 for processing that has been emitted by a light source (not shown), has passed through a light transmitting portion 210, and has been guided from the incident end 215. The light transmitting portion 210 is, for example, an optical fiber having a core diameter of φ0.01 to 1 mm, and guides light (for example, a laser beam) generated by the light source to the optical processing head 200.

The optical processing head 200 condenses, on the process surface 260, the ray 205 for processing that has entered the optical processing head 200 from the incident end 215, heats the process surface 260, and forms a molten pool 261 on the process surface 260.

The nozzle 203 has a ray path that does not cut off the ray 205 for processing. The nozzle 203 receives supply of a powder material and gas from a material supply device (not shown) through a material supply portion, and ejects a processing material 250 mixed in the gas to the molten pool 261 of the process surface 260. After that, the molten pool 261 is cooled to deposit the material on the process surface 260. The molten pool 261 is moved on the process surface 260, and melting, material supply, and cooling are repeated, implementing three-dimensional shaping.

(Arrangement of Inspection Unit)

The inspection unit 202 is a unit for observing the status of the process surface 260 and its vicinity from a viewpoint along the optical axis of the ray 205 for processing. The inspection unit 202 is arranged upstream of the condenser lens 212 and downstream of the collimator lens 211.

The inspection unit 202 includes an image capturing device 221 that captures a spot image of reflected light 207 of a ray 206 for inspection. Further, the inspection unit 202 includes a comparator 225 that compares the spot image of the ray 206 for inspection with a reference spot image. The inspection unit 202 further includes one-way mirrors 222 and 223 provided inside the housing 214, and a ray emitter 224 for inspection.

The image capturing device 221 is arranged off the ray 205 for processing. The inspection unit 202 includes the one-way mirror 222 that transmits the ray 205 for processing and guides, to the image capturing device 221, the reflected light 207 of the ray 206 for inspection reflected by the process surface 260.

The ray emitter 224 for inspection is arranged off the ray 205 for processing. The ray emitter 224 for inspection may be a light source for inspection, but is not limited to this and may be the exit port of a light transmitting portion such as an optical fiber.

The one-way mirror 222 is coated to transmit the ray 205 for processing (wavelength of 1,000 nm or more) and reflect part of the ray 206 for inspection (wavelength of 400 to 800 nm) by the downstream surface of the one-way mirror 222. The reflected light 207 reflected by the process surface 260 is reflected by the one-way mirror 222, and guided to the image capturing device 221. Feedback control of processing parameters is performed in accordance with the observed processing status, and the processing accuracy can be improved. The one-way mirror 223 transmits the ray 205 for processing and guides, to the process surface 260, the ray 206 for inspection emitted by the ray emitter 224 for inspection.

The ray emitter 224 for inspection and the image capturing device 221 are arranged off the ray 205 for processing. The ray emitter 224 for inspection is, for example, an LED, and the wavelength of the ray 206 for inspection is 400 to 450 nm. However, the ray emitter 224 for inspection is not limited to this, and may be a halogen lamp, an incandescent lamp, a krypton lamp, or the like as long as it can emit the ray 206 for inspection having a wavelength (for example, a wavelength of 400 to 800 nm) different from the wavelength (for example, a wavelength of 1,060 nm) of the ray 205 for processing. The image capturing device 221 includes a lens 221a, and an image sensor 221b such as a CCD or CMOS sensor. A ray that has reached the lens 221a is condensed to each pixel of the image sensor 221b.

Figure 3:
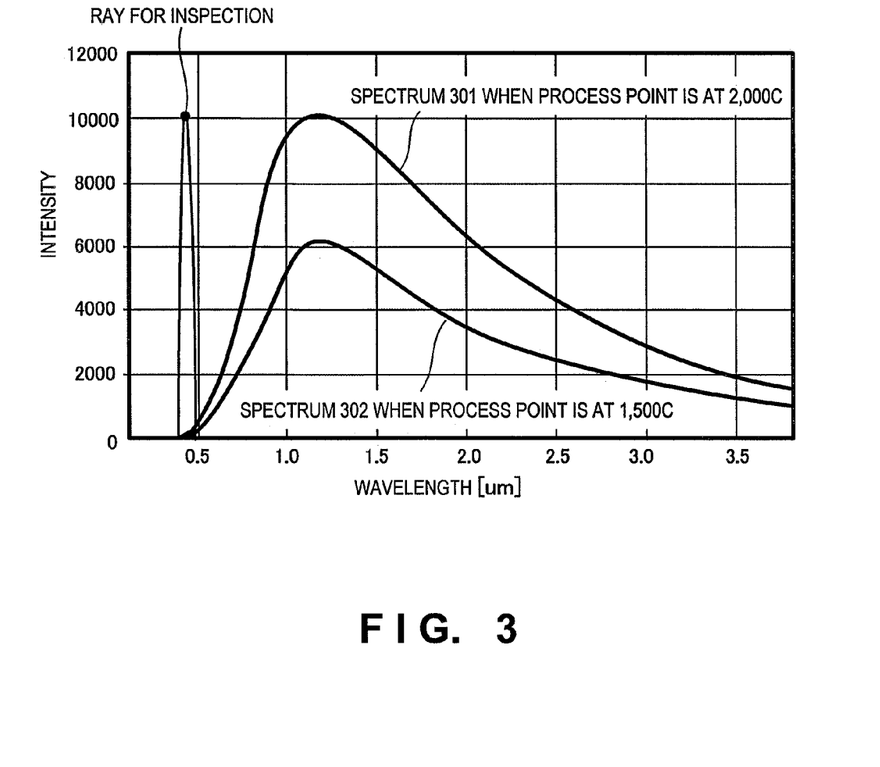
FIG. 3 is a graph showing the wavelength separation effect of the optical processing head according to the second embodiment of the present invention.

The temperature of the process surface 260 is raised to be high during processing. At this time, thermal radiation is generated from the process surface 260. The wavelength spectrum of this thermal radiation complies with a Planck distribution shown in FIG. 3. For example, FIG. 3 shows spectra 301 and 302 each indicating the relationship between the wavelength and the intensity when the temperature at the process point is 2,000° C. or 1,500° C.

The thermal radiation from the process surface 260 and the ray 206 for inspection simultaneously enter the image sensor. If the wavelength of the thermal radiation is equal or close to that of the ray 206 for inspection, the thermal radiation becomes noise in the image sensor. To prevent this, the wavelength of the ray 206 for inspection is preferably set to be different from that of the thermal radiation. This has an effect capable of reducing noise.

Letting c be the light velocity, h be the Planck constant, and κ be the Boltzmann constant with respect to a maximum temperature T assumed on the process surface 260, the relation between a wavelength λ and luminance I of the ray 206 for inspection is given by:

$$I(\lambda) > (2hc^2/\lambda^5)/[\exp(hc/\lambda\kappa T)-1]$$

More specifically, the ray 206 for inspection has a wavelength of 1 μm or less, and is preferably ultraviolet light or blue light having a wavelength of 500 nm or less.

Typical examples of a metal powder are iron and SUS (Steel Use Stainless), and their melting point is about 1,500° C. In FIG. 3, the peak wavelength of the thermal radiation spectrum when the process point is at 1,500° C. is about 1.2 μm. If the wavelength is set to be equal to or smaller than 1 μm which is smaller than this peak wavelength, the radiation intensity abruptly decreases. In contrast, the radiation intensity gradually decreases at a wavelength larger than the peak wavelength. For this reason, noise generated by the thermal radiation can be efficiently reduced by setting the wavelength of the ray 206 for inspection to be equal to or smaller than 1 μm.

When the ray 206 for inspection having a wavelength of 500 nm or more is employed, Rayleigh scattering becomes main scattering in a processing material as small as about several μm. Since the scattering becomes weak in reverse proportion to the fourth power of the wavelength, the concentration of the processing material may not be inspected at high accuracy. Therefore, this embodiment implements high-accuracy inspection of the concentration of a processing material by setting the wavelength of the ray 206 for inspection to be equal to or smaller than 500 nm so that the processing material is scattered strongly by Mie scattering even when the processing material is a powder as small as about several μm.

The comparator 225 compares a reference spot image with the spot image of the ray 206 for inspection. When a process surface perpendicular to the optical axis of the ray 205 for processing is set as a reference process surface and the processing material 250 is not ejected, the spot image of the reflected light 207 of the ray 206 for inspection reflected by this reference process surface is set as a reference spot image.

Based on the distance between a spot center included in the spot image of the ray 206 for inspection and a reference spot center included in the reference spot image, the comparator 225 calculates the tilt angle of the process surface 260 with respect to the reference process surface. Also, the comparator 225 calculates the concentration of the processing material 250 on the process surface 260 from the difference in size between the spot image of the ray for inspection and the reference spot image. The optical processing head 200 further includes an adjuster 208 that adjusts the ejection amount of the processing material 250 based on the concentration of the processing material 250 on the process surface 260.

Figure 4:
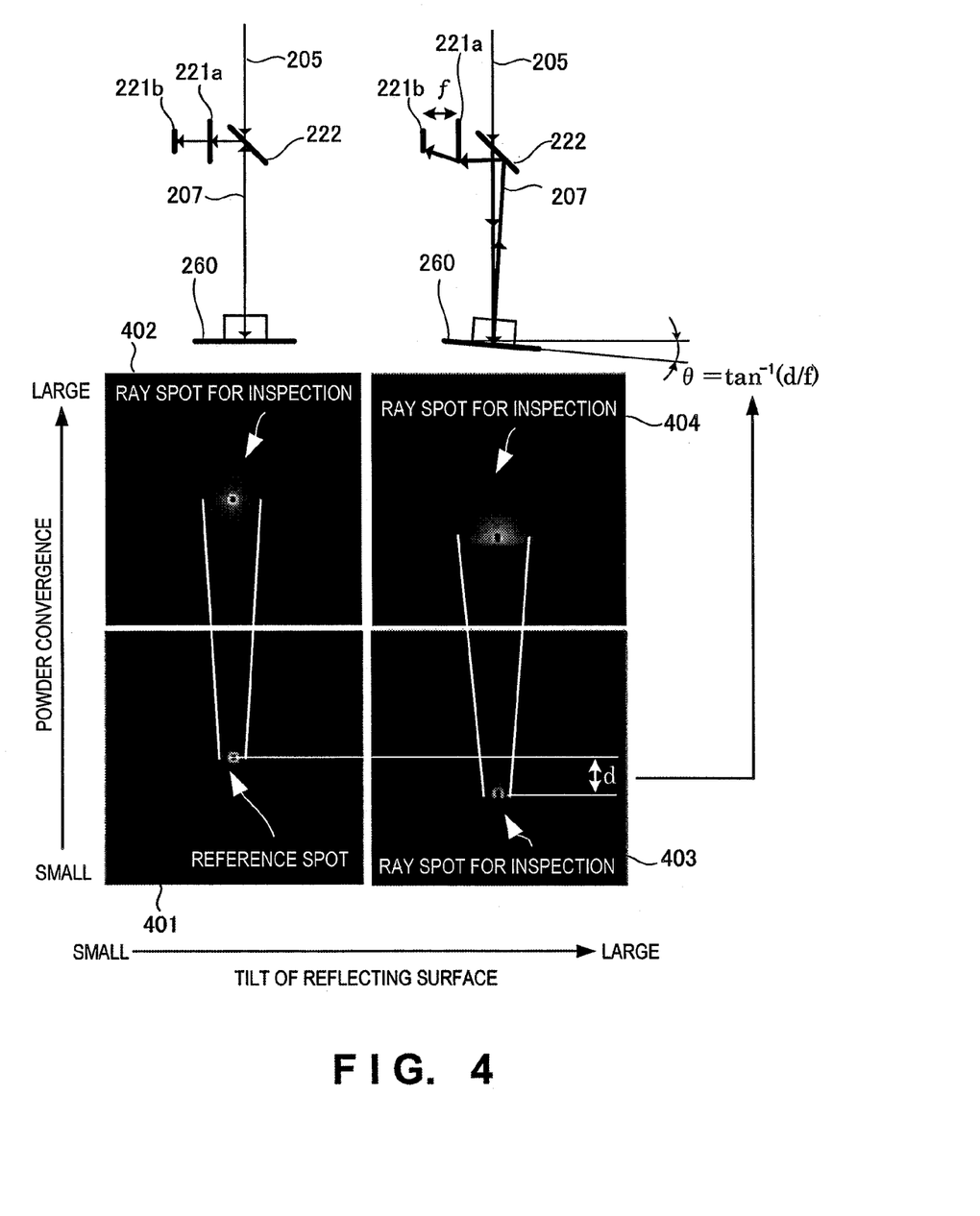
FIG. 4 is a view showing the captured image of the optical processing head according to the second embodiment of the present invention.

FIG. 4 is a view showing the result of calculating an image captured by the image capturing device 221 by a ray tracing simulation.

An image as the result of capturing an image of the reflected light 207 by the image capturing device 221 will be called a ray spot image for inspection. The spot diameter of the ray spot image for inspection is set to be, for example, a full width at half maximum with reference to the peak position of the spot.

When no powder material is ejected to the process surface 260 and the process surface is perpendicular to the optical axis of the ray for processing, a reference spot image 401 is output. To the contrary, when a powder material is ejected to the process surface 260 and the powder exists densely near the process surface 260, the ray spot for inspection becomes larger than the reference spot, as in a ray spot image 402 for inspection.

If the powder convergence is high, the concentration of the powder present in the powder convergent region becomes high, and the reflected light 207 of the ray 206 for inspection is scattered by the powder. That is, as the powder convergence is higher, the count at which the ray for inspection is scattered by the powder becomes higher. As the scattering count is higher, the ray spot for inspection received by the image sensor becomes wider. It can be said that the powder convergence is higher as the difference of the ray spot diameter for inspection from the reference spot diameter is larger. From this, the diameter of the ray spot for inspection is measured and compared with the diameter of the reference spot, thereby calculating the powder convergence. The powder convergence is quantified by the powder concentration on the process surface 260.

When no powder material is ejected to the process surface 260 and the process surface 260 tilts, the position of the ray spot for inspection shifts from the reference spot, as in a ray spot image 403 for inspection. Letting d be the distance of this shift on the screen, a tilt θ of the process surface 260 can be given using a distance f between the lens 221a and the image sensor 221b:

$$\theta = \tan^{-1}(d/f)$$

When the powder material is ejected and the process surface 260 tilts, the position of the ray spot for inspection shifts from the reference spot, and the ray spot for inspection becomes larger than the reference spot, as in a ray spot image 404 for inspection.

A plane perpendicular to the optical axis is defined as the reference of the tilt of the process surface 260. As the tilt of the process surface 260 is larger, the distance d between the peak position of the ray spot for inspection and the peak position of the reference spot becomes larger. From this, the powder convergence and the tilt angle θ of the process surface can be calculated.

Whether the powder concentration on the process surface is proper can be determined from information of the powder convergence. When the powder concentration does not have a desired value, it can be adjusted by increasing/decreasing the powder supply amount.

In general, the tilt angle θ is desirably 0°. At this time, the optical axis of the ray 205 for processing and the process surface 260 are perpendicular to each other. When the optical axis of the ray 205 for processing and the process surface 260 are perpendicular to each other, the Fresnel reflection of the ray 205 for processing by the process surface 260 is minimized, and the light use efficiency is maximized. Hence, when the optical axis of the ray 205 for processing or the process surface 260 is adjusted to always keep the tilt angle to be 0, the light use efficiency can always be maximized. The tilt angle θ can be maintained at 0° regardless of the processing status by, for example, controlling a stage supporting the process surface 260 or controlling the tilt of the optical processing head 200.

When the reflectance of the ray for processing on the process surface 260 is high (for example, a copper plate), reflected light of the ray for processing returns to the light source for processing and may damage the light source for processing. In this case, it is also important to set the tilt angle θ to be a value other than 0° so that the ray for processing does not directly return to the light source for processing. That is, the damage to the light source for processing can be suppressed by setting the tilt angle θ to be a value other than 0.

Figure 5:
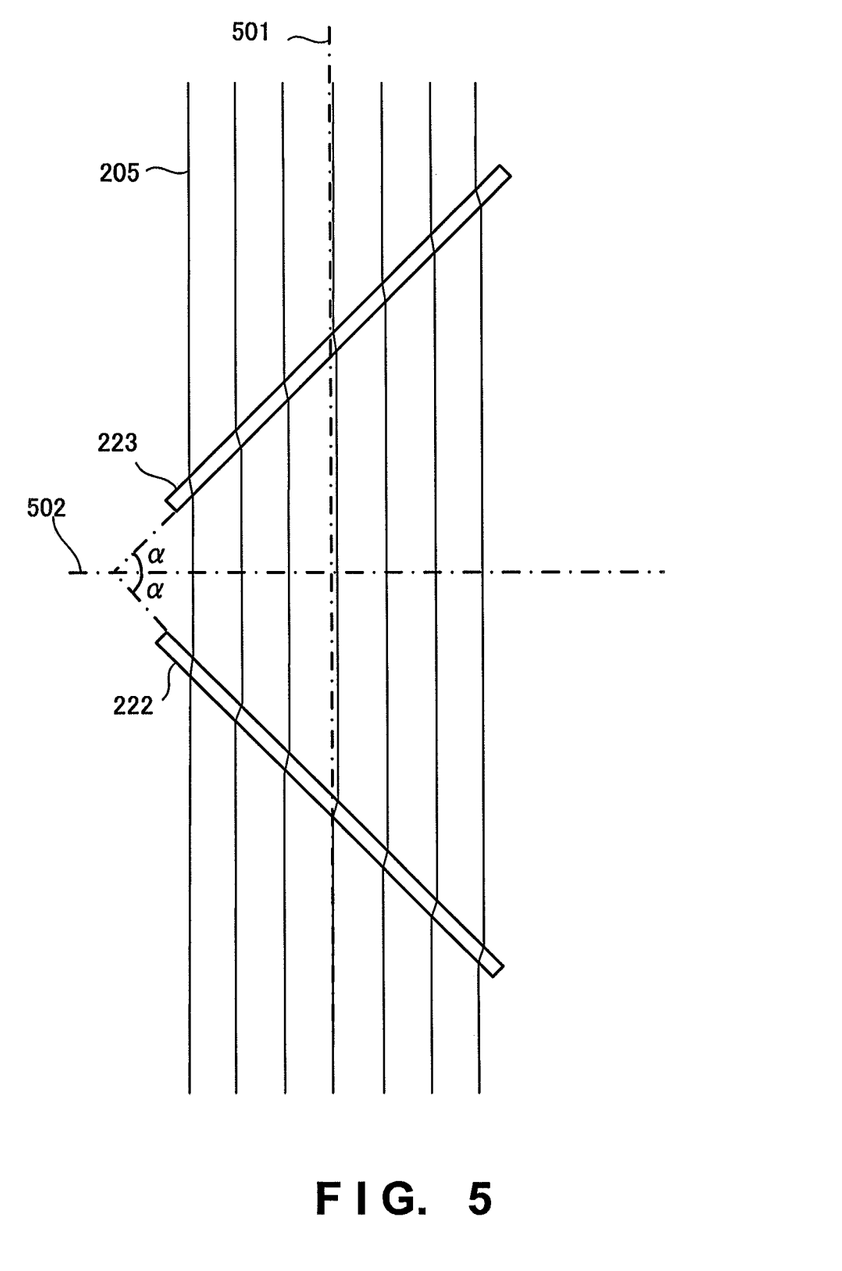
FIG. 5 is a view for explaining the optical path of a ray for processing in the optical processing head according to the second embodiment of the present invention.

FIG. 5 is a view for explaining the optical axis shift of the ray 205 for processing by the one-way mirrors 222 and 223. As shown in FIG. 5, the reflecting surface of the one-way mirror 222 and that of the one-way mirror 223 are symmetrical about a plane 502 perpendicular to, an optical axis 501 of the ray 205 for processing. That is, tilt angles α of the reflecting surfaces of the one-way mirrors 222 and 223 with respect to the axis of the ray 205 for processing are equal to each other. Shifts of the ray 205 for processing from the optical axis by the one-way mirrors 222 and 223 cancel each other. This has an effect in which shift correction of the optical axis 501 of the ray 205 for processing becomes unnecessary.

Figure 6:
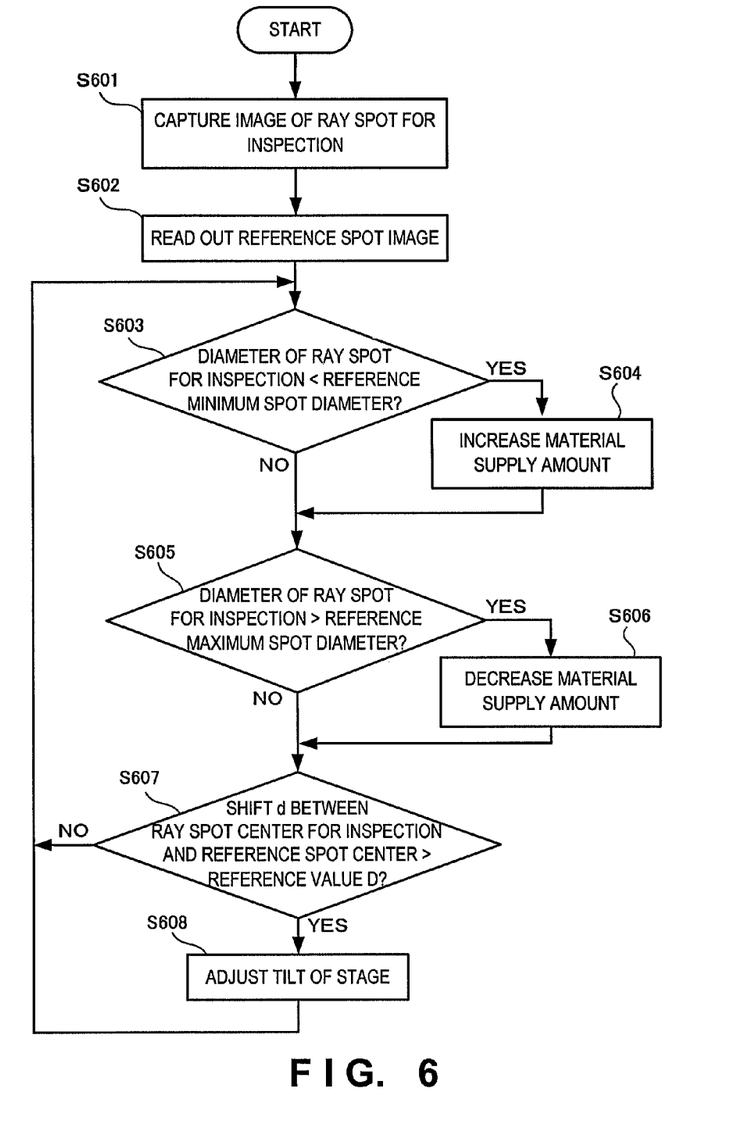
FIG. 6 is a flowchart showing the sequence of control in the optical processing head according to the second embodiment of the present invention.

FIG. 6 is a flowchart showing the sequence of processing to be performed by the inspection unit 202. First, in step S601, the image capturing device 221 captures an image of a ray spot for inspection. Then, in step S602, a reference spot image is read out from a database (not shown). Here, a reference minimum spot image and a reference maximum spot image are read out as the reference spot image. The reference minimum spot image is a reference spot image having a minimum spot diameter. The reference maximum spot image is a reference spot image having a maximum spot diameter. For example, the reference minimum spot image is a reference spot image reflected by the reference process surface perpendicular to the optical axis of the ray 205 for processing when the processing material 250 is not ejected. In contrast, the reference maximum spot image is a reference spot image reflected by the reference process surface when the processing material 250 is ejected in a maximum amount.

In step S603, the comparator 225 compares the ray spot diameter for inspection with the reference minimum spot diameter. If the ray spot diameter for inspection is smaller, the process advances to step S604, and the adjuster 208 increases the supply amount of the material by the nozzle 203.

In step S605, the comparator 225 compares the ray spot diameter for inspection with the reference maximum spot diameter. If the ray spot diameter for inspection is larger, the process advances to step S606, and the adjuster 208 decreases the supply amount of the material by the nozzle 203.

Further, the process advances to step S607, and the comparator 225 determines whether the shift d between the center of the ray spot for inspection and the center of the reference spot is equal to or smaller than a reference value D. If the shift d exceeds the reference value D, the process advances to step S608 to adjust the tilt of the stage (not shown) (or the optical processing head).

As described above, according to the second embodiment, the state of a process surface such as the tilt of the process surface or the concentration of a processing material in gas on the process surface can be easily inspected by a simple arrangement. The optical processing head can be controlled in accordance with the state of the process surface.

Third Embodiment

Figure 7:
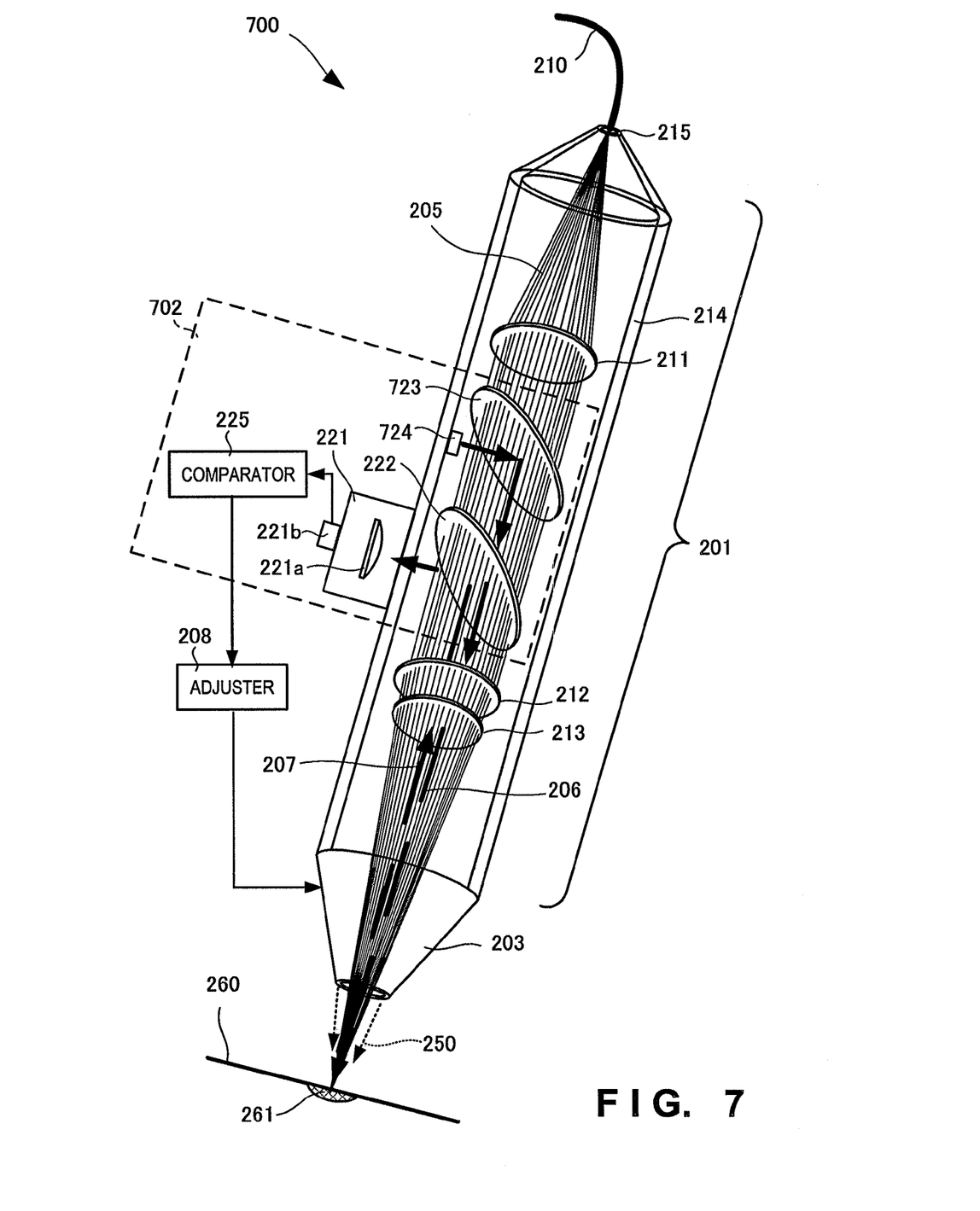
FIG. 7 is a sectional view showing the arrangement of an optical processing head according to the third embodiment of the present invention.

An optical processing head according to the third embodiment of the present invention will be described with reference to FIG. 7. FIG. 7 is a view for explaining the arrangement of an optical processing head 700 according to this embodiment. In the optical processing head 700 according to the third embodiment, unlike the second embodiment, an inspection unit 702 includes a one-way mirror 723 and a ray emitter 724 for inspection. Unlike the one-way mirror 223, the one-way mirror 723 is attached with the same tilt as that of a one-way mirror 222. In accordance with this, the ray emitter 724 for inspection is provided on the side of an image capturing device 221. The remaining arrangement and operation are the same as those in the second embodiment, so the same reference numerals denote the same arrangement and operation and a detailed description thereof will not be repeated.

According to the third embodiment, since the ray emitter 724 for inspection and the image capturing device 221 can be provided on the same side of the optical processing head 700, the same effect as that of the second embodiment can be obtained by a more compact arrangement. However, a contrivance to cope with the shift of the optical axis as described with reference to FIG. 5 (for example, a condenser lens 212 is arranged with a shift) is necessary.

Fourth Embodiment

Figure 8:
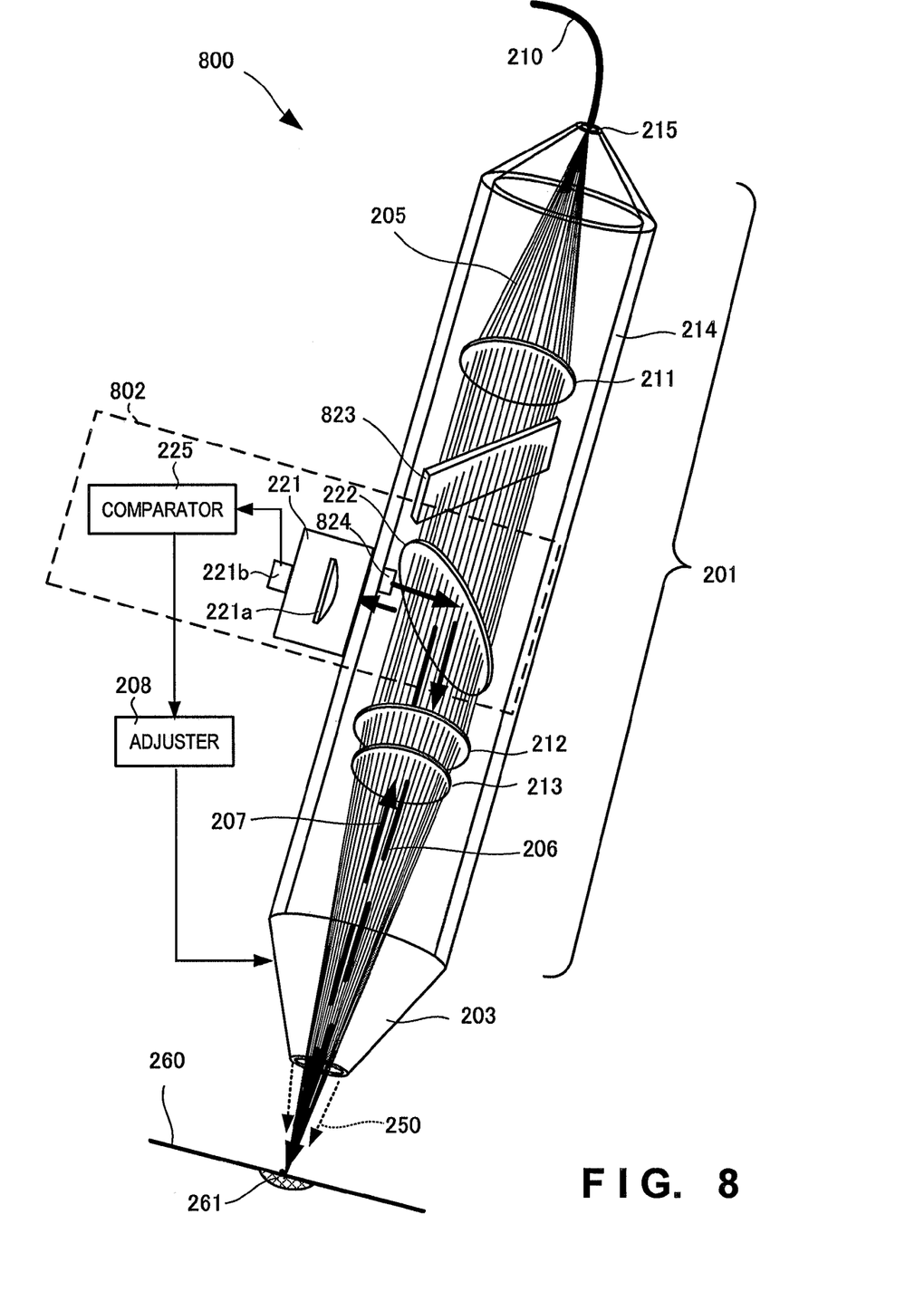
FIG. 8 is a sectional view showing the arrangement of an optical processing head according to the fourth embodiment of the present invention.

An optical processing head according to the fourth embodiment of the present invention will be described with reference to FIG. 8. FIG. 8 is a view for explaining the arrangement of an optical processing head 800 according to this embodiment. In the optical processing head 800 according to the fourth embodiment, unlike the second embodiment, an inspection unit 802 includes a flat transmission plate 823 instead of the one-way mirror 223, and a ray emitter 824 for inspection is arranged near an image capturing device 221. The remaining arrangement and operation are the same as those in the second embodiment, so the same reference numerals denote the same arrangement and operation and a detailed description thereof will not be repeated.

A one-way mirror 222 and the transmission plate 823 are symmetrical about a plane perpendicular to the optical axis of a ray 205 for processing. That is, the tilt angles of the one-way mirror 222 and transmission plate 823 with respect to the axis of a ray 205 for processing are equal to each other. The shift of the optical axis of the ray 205 for processing by the one-way mirror 222 can be canceled by refraction by the transmission plate 823.

According to the fourth embodiment, the same effect as that of the second embodiment can be obtained by a more compact arrangement. Further, there is an effect in which shift correction of the optical axis of the ray 205 for processing becomes unnecessary.

Fifth Embodiment

Figure 9:
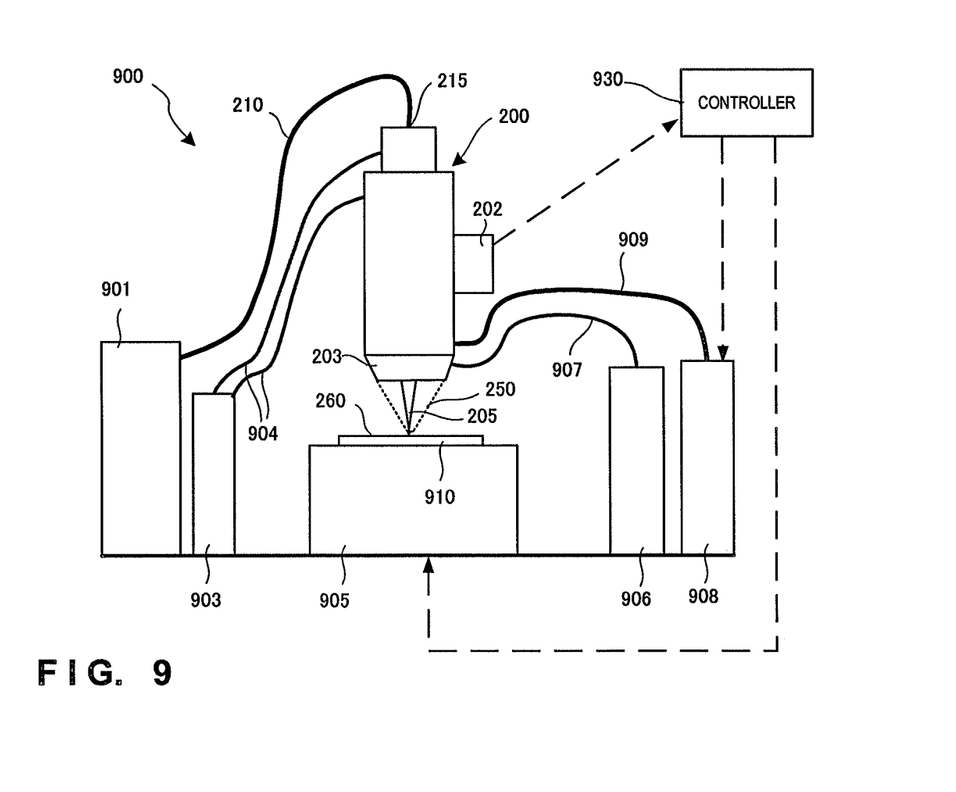
FIG. 9 is a view showing the arrangement of an optical processing apparatus according to the fifth embodiment of the present invention.

An optical processing apparatus 900 according to the fifth embodiment of the present invention will be described with reference to FIG. 9. The optical processing apparatus 900 is an apparatus that includes one of the optical processing heads 100, 200, 700, and 800 explained in the above-described embodiments, and generates a three-dimensional shaped object (or overlay welding) by melting a material by heat generated by condensed light. Here, the optical processing apparatus 900 including an optical processing head 200 will be explained as an example.

<<Apparatus Arrangement>>

In addition to the optical processing head 200, the optical processing apparatus 900 includes a light source 901, a light transmitting portion 210, a coolant supply device 903, a coolant supply portion 904, a stage 905, a gas supply device 906, a gas supply portion 907, a material supply device 908, a material supply portion 909, and a controller 930.

The light source 901 can be a laser, an LED, a halogen lamp, a xenon lamp, an incandescent lamp, or the like. The wavelength of a ray is, for example, 1,060 nm, but is not limited to this.

The coolant supply device 903 stores, for example, water as a coolant, and supplies the coolant by a pump to the optical processing head 200 via the coolant supply portion 904. The coolant supply portion 904 is a resin or metal hose having an inner diameter of φ2 to 6. The coolant is supplied into the optical processing head 200, circulated inside it, and returned to the coolant supply device 903, thereby suppressing the temperature rise of the optical processing head 200. The coolant supply amount is, for example, 1 to 10 L/min.

The stage 905 is, for example, an X stage, an X-Y stage, or an X-Y-Z stage, and can operate the respective axes (X, Y, and Z).

The gas supply device 906 supplies a purge gas to the optical processing head 200 through the gas supply portion 907. The purge gas is, for example, nitrogen, argon, or helium. However, the purge gas is not limited to this and may also be another gas as long as the purge gas is an inert gas. The purge gas supplied to the optical processing head 200 is ejected from a nozzle 203 along the above-described ray.

The material supply device 908 supplies a material to the nozzle 203 via the material supply portion 909. Examples of the material are a metal particle, a resin particle, a metal wire, and a resin wire. The material supply device 908 can simultaneously supply even a carrier gas. The material supply portion 909 is, for example, a resin or metal hose, and guides, to the nozzle 203, a powder flow prepared by mixing a material in a carrier gas. However, when the material is a wire, no carrier gas is necessary.

Although not shown, the optical processing apparatus 900 includes an orientation control mechanism and position control mechanism that control the orientation and position of the optical processing head 200.

<<Apparatus Operation>>

Next, the operation of the optical processing apparatus 900 will be explained. A shaped object 910 is created on the stage 905. The purge gas is ejected from the nozzle 203 to a process surface 260. Thus, the peripheral environment of the molten pool is purged by the purge gas. By selecting an oxygen-free inert gas as the purge gas, oxidization of the process surface 260 can be prevented.

The optical processing head 200 is cooled by the coolant supplied from the coolant supply device 903 through the coolant supply portion 904, suppressing the temperature rise during processing.

By scanning the optical processing head 200 along the process surface 260 at the same time as the above-described series of operations, desired shaping can be performed while depositing the material. That is, this apparatus can implement overlay welding or three-dimensional shaping.

The controller 930 acquires the status of the process surface 260 from an inspection unit 202, controls the material supply device 908 in accordance with this status, and changes the amount of a processing material to be ejected to the process surface 260. Also, the controller 930 acquires the status of the process surface 260 from the inspection unit 202, controls the stage 905 in accordance with this status, and changes the tilt of the process surface 260 so that the process surface 260 and the optical processing head 200 are located at predetermined relative positions.

As described above, according to the fifth embodiment, higher-accuracy optical processing can be implemented by easily inspecting the status of a process surface and setting processing conditions suited to the status.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the control program. Especially, a non-transitory computer readable medium storing a program for causing a computer to execute processing steps included in the above-described embodiments falls within the scope of the present invention.

The invention claimed is:

1. An optical processing head comprising:
a light guide that guides, to a process surface, a ray for processing and a ray for inspection different in wavelength from the ray for processing; and
an inspection unit that inspects a state of the process surface from reflected light of the ray for inspection reflected by the process surface,
wherein letting c be a light velocity, h be a Planck constant, and κ be a Boltzmann constant with respect to a maximum temperature T assumed on the process surface, a relation between a wavelength λ and luminance I of the ray for inspection is given by:

$$I(\lambda) > (2hc^2/\lambda^5)/[\exp^{hc/\lambda \kappa T} - 1].$$

2. The optical processing head according to claim 1, wherein the state of the process surface is a tilt of the process surface or a concentration of a processing material on the process surface.

3. The optical processing head according to claim 1, wherein the wavelength of the ray for inspection is not larger than 1 μm.

4. The optical processing head according to claim 3, wherein the ray for inspection is ultraviolet light or blue light having a wavelength of not larger than 500 nm.

5. The optical processing head according to claim 1, wherein said inspection unit includes an image capturing unit that captures a spot image of the ray for inspection.

6. An optical processing head, comprising:
a light guide that guides, to a process surface, a ray for processing and a ray for inspection different in wavelength from the ray for processing; and
an inspection unit that inspects a state of the process surface from reflected light of the ray for inspection reflected by the process surface, wherein said inspection unit includes a comparator that compares the spot image of the ray for inspection with a reference spot image.

7. The optical processing head according to claim 6, wherein the reference spot image is an image obtained by capturing an image of the ray for inspection reflected by a reference process surface perpendicular to an optical axis of the ray for processing.

8. The optical processing head according to claim 7, wherein the comparator calculates a tilt angle of the process surface with respect to the reference process surface, based on a distance between a spot center included in the spot image of the ray for inspection and a reference spot center included in the reference spot image.

9. The optical processing head according to claim 7, further comprising a nozzle that ejects a processing material toward a molten pool formed on the process surface by the ray for processing,
wherein the reference spot image is an image obtained by capturing an image of the ray for inspection reflected by the process surface to which the processing material is not ejected.

10. The optical processing head according to claim 9, wherein the comparator calculates, from a difference in size between the spot image of the ray for inspection and the reference spot image, a concentration of the processing material in gas on the process surface.

11. The optical processing head according to claim 10, further comprising an adjuster that adjusts an ejection amount of the processing material based on the concentration of the processing material.

12. The optical processing head according to claim 5, wherein
the image capturing unit is arranged off the ray for processing, and
said inspection unit further includes a first one-way mirror that transmits the ray for processing, and guides the ray for inspection reflected by the process surface to the image capturing unit.

13. The optical processing head according to claim 12, wherein
an emitter of the ray for inspection is arranged off the ray for processing, and
said inspection unit further includes a second one-way mirror that transmits the ray for processing, and guides the ray for inspection emitted by the emitter to the process surface.

14. The optical processing head according to claim 13, wherein a reflecting surface of the first one-way mirror and a reflecting surface of the second one-way mirror are symmetrical about a plane perpendicular to an optical axis of the ray for processing.

15. An optical processing apparatus comprising:
an optical processing head defined in 1;
a light source for processing that emits the ray for processing; and
a light source for inspection that emits the ray for inspection.

16. An optical processing apparatus comprising:
an optical processing head defined in claim 8; and
a controller that controls a tilt of one of the process surface and the optical processing head in accordance with the calculated tilt angle.

17. An optical processing apparatus comprising:
an optical processing head defined in claim 10; and
a controller that controls an ejection amount of the processing material in accordance with a concentration of the processing material.

18. A control method of an optical processing apparatus defined in claim 16, comprising controlling a tilt of one of the process surface and the optical processing head in accordance with the calculated tilt angle so as to locate the process surface and the optical processing head at predetermined relative positions.

19. A control method of an optical processing apparatus defined in claim 17, comprising controlling an ejection amount of the processing material to make a concentration of the processing material fall within a predetermined range.

20. A control program of an optical processing apparatus defined in claim 16, causing a computer to execute controlling a tilt of one of the process surface and the optical processing head in accordance with the calculated tilt angle so as to locate the process surface and the optical processing head at predetermined relative positions.

21. A control program of an optical processing apparatus defined in claim 17, causing a computer to execute controlling an ejection amount of the processing material to make a concentration of the processing material fall within a predetermined range.

* * * * *